April 8, 1952     F. BOWERS ET AL     2,591,913

MEANS FOR RELEASABLY SUPPORTING AIRCRAFT COMPONENTS

Filed June 24, 1947     2 SHEETS—SHEET 1

*INVENTOR.*
FRANK BOWERS
PAUL F. JOSEPH
KENNETH C. HOLMES

BY Richard W. Treverton
*ATTORNEY*

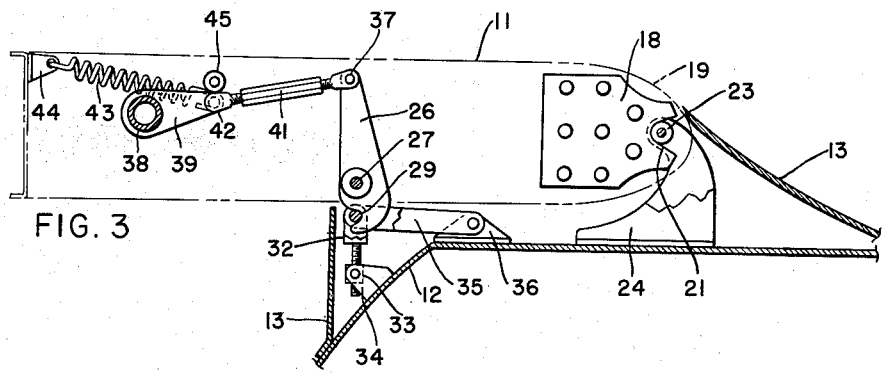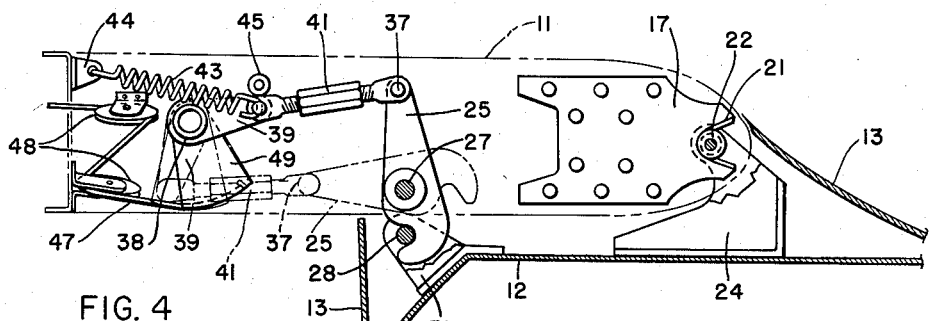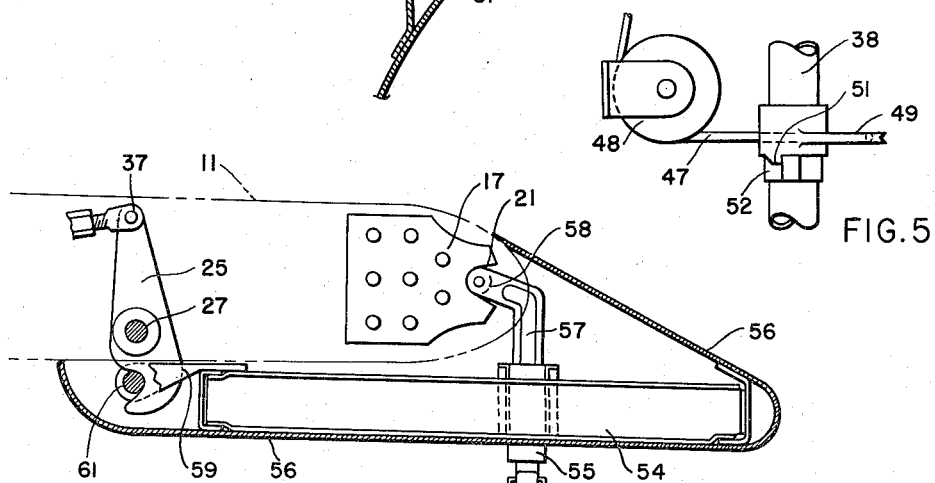

Patented Apr. 8, 1952

2,591,913

UNITED STATES PATENT OFFICE 2,591,913

MEANS FOR RELEASABLY SUPPORTING AIRCRAFT COMPONENTS

Frank Bowers, Williamsville, N. Y., Paul F. Joseph, Columbus, and Kenneth C. Holmes, Westerville, Ohio, assignors to Curtiss-Wright Corporation, a corporation of Delaware Application June 24, 1947, Serial No. 756,762

5 Claims. (Cl. 244—135)

The present invention relates to means for releasably supporting external streamlined fuel tanks, auxiliary wing tip sections, bombs and other aircraft components at the tips of aircraft wings.

In the interests of drag reduction it is desirable to mount such fuel tanks, and similar releasable components, as close to the wing tip as possible. However, the wing tip is usually very thin and for structural reasons suitable release mechanisms heretofore available could not be accommodated therein. Accordingly it has been necessary either to mount the releasable component inboard from the wing tip or to allow the release mechanism to protrude from the wing subsequent to release of the component.

The present invention provides a novel supporting means whereby the longitudinal center line of the releasable external fuel tank or similar component may be disposed almost directly beneath the wing tip. The wing tip and the releasable component are provided with cooperating formations for supporting the component against movement away from the wing in all directions except outwardly in a spanwise direction; and the release mechanism, disposed a substantial distance inboard of the wing tip, restrains the component against such outward spanwise movement. With this novel arrangement the major portion of the load of the releasable component is borne by the tip of the wing, but the release mechanism is disposed inboard from the tip where the wing thickness is greater. Accordingly, the release mechanism may be accommodated entirely within the confines of the wing subsequent to release of the component.

The supporting mechanism includes latch elements which, when engaged with latch detents on the releasable component, project from the confines of the wing, but preferably are enclosed by a fairing which surrounds the juncture of the component with the wing. Upon release of the component the latch elements are pivotally retracted to lie entirely within the wing confines and so not to interfere with airflow around the wing. The pivotal movement is accomplished by a toggle mechanism provided with spring means which serve to resiliently retain the toggle elements in both of the limit positions thereof.

The foregoing and other objects and advantages will become apparent from the following description of the typical embodiment of the invention shown in the accompanying drawings, wherein.

Figure 1:
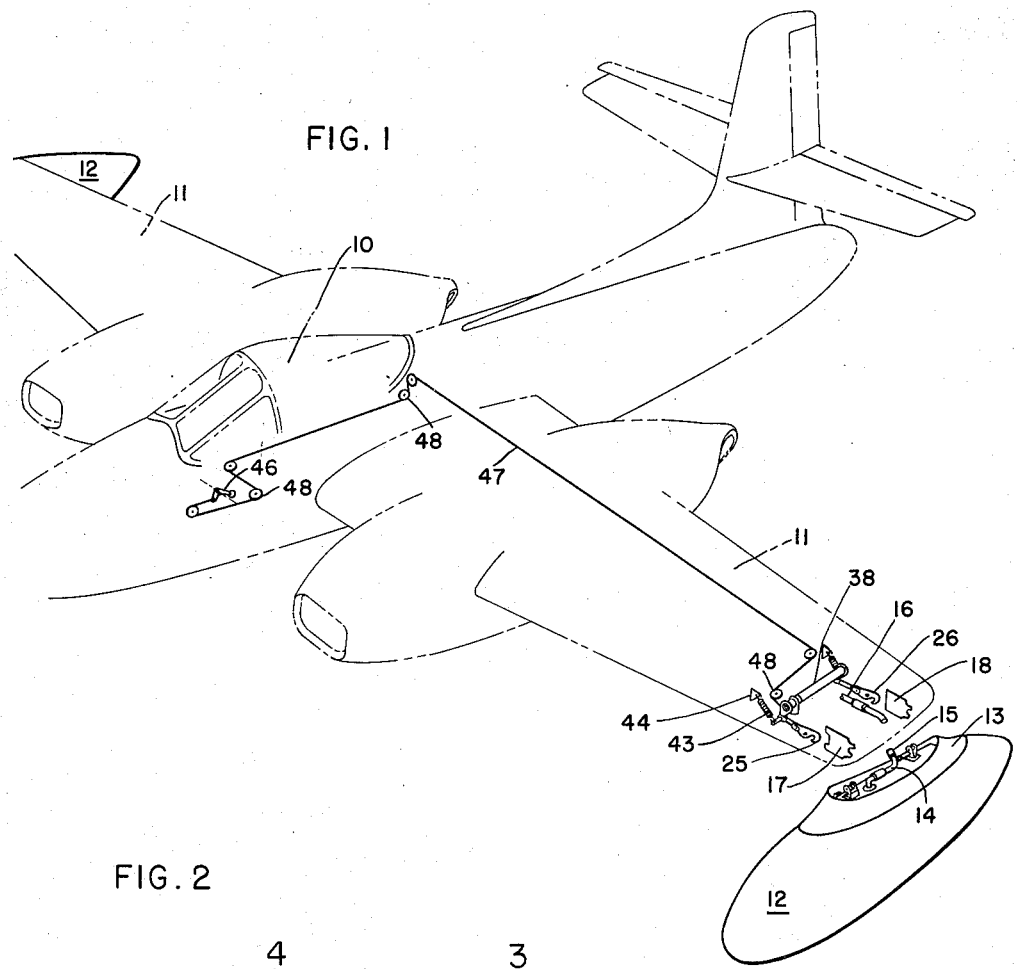
Figure 1 is a perspective view showing the general arrangement with the supporting mechanism in released position, the outline of the airplane being shown in phantom.
Figure 2:
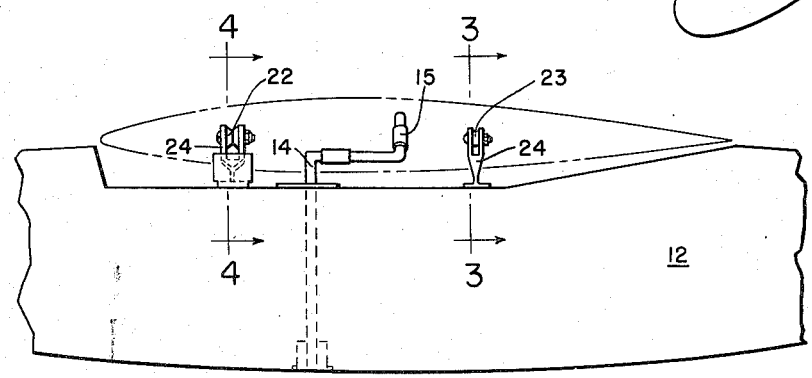
Figure 2 is a fragmentary side elevation of the releasable component with the airplane wing tip indicated in broken lines.

Figures 3 and 4 are fragmentary vertical sectional views, taken approximately as indicated by the lines 3—3 and 4—4, respectively, of Figure 2 with the airplane wing structure shown by broken lines;

Figure 5 is a detail plan view of a play connection in the operating system shown in Figures 1 and 4; and, Figure 6 is a view similar to Figure 4 but illustrating a modified application of the invention.

As shown in Figure 1 the airplane with pilot's compartment 10 and wing panels 11 is provided at the wing tips with releasable components 12. In the illustrated embodiment these comprise elongated streamlined fuel tanks whose longitudinal centerlines are disposed substantially directly beneath the wing tips. Each tank 12 preferably has secured thereto fairing 13 which extends around the zone of juncture of the tank with the wing in order to provide for smooth flow of air over the adjacent surfaces. The fairing encloses the releasable supporting means now to be described in detail, and also encloses the tubing 14, with detachable connection 15, through which fuel may pass from the tank to a wing conduit 16 which leads to the aircraft engine (not shown).

The releasable supporting means for each tank 12 includes a pair of plates 17 and 18 secured to the tip ends of the front and rear spars (not shown) of the wing or to other suitable wing structure for supporting them in chordwise spaced relation. As shown in Figures 3 and 4 these plates are so formed as to extend into the attenuated tip portion 19 of the wing, and each is provided with a recess 21 which opens outwardly in a spanwise direction. Seated in the respective recesses 21 of plates 17 and 18 are rollers 22 and 23 mounted on brackets 24 which are secured to the upper portion of the tank. As shown in Figures 2 and 4 one of the rollers, in this case roller 22, has a beveled peripheral groove for receiving the beveled edge of the recess 21 in plate 17, this arrangement restraining the tank against fore and aft shifting relative to the wing.

Latch elements 25 and 26 are mounted on pivot pins 27 carried by the wing structure a substantial distance inboard of the wing tip. The latch elements have hook portions for engaging latch detent pins 28 and 29 secured to the tank. One of the pins, in this case pin 28, is secured to the tank by a rigid bifurcated bracket 31, while the other pin, 29, is preferably secured to the tank by a fitting that is adjustable to compensate for manufacturing tolerances in the airplane wing, in the tank and in the fittings thereon. The adjustable fitting includes a clevis 32 having a screw shank threaded to a block 33 that is pivoted to a bracket 34 fixed to the tank. The adjustable bracket further includes a bifurcated link 35 pivoted to another bracket, 36, that is fixed to the tank. By removing the pin 29, which connects clevis 32 to link 35, the clevis may be rotated to screw its threaded shank further into or out of block 33 to change the location of the pin.

Journalled in the wing and extending chordwise thereof is a latch operating shaft 38. On the ends of this shaft are toggle linkages that are pivoted, as indicated at 37, to latch elements 25 and 26. Each toggle comprises an arm 39 rigidly connected to shaft 38, and a link 41 that is pivoted to arm 39 at the toggle elbow 42. Preferably the links 41 are in the form of turnbuckles so that their lengths may be adjusted to insure proper fitting of the latch elements. A tension spring 43 is extended between the elbow of each toggle and a bracket 44 that is fixed to the aircraft wing structure.

Each spring 43 is so arranged that in the operative position of the latch it holds the toggle elbow in its upward limit position, slightly above the dead center position in which the toggle is most fully extended. This upward limit position of each toggle is determined by a stop 45 mounted rigidly on the wing structure. The springs also serve to retract the latch elements 25 and 26 by collapsing the toggles downwardly. In Figure 4 the downwardly collapsed position of the toggle elements 39, 41 and the corresponding position of latch 25, are shown by broken lines. It will be noted that in this position no part of the latch 25 protrudes from the confines of the wing.

For releasing the latch mechanism a lever 46 is provided in the pilot's compartment 10 of the airplane. This lever is connected by a flexible cable 47, that is guided by sheaves 48, to a sector 49 rotatably mounted on the shaft 38. The hub of the sector 49 has a shoulder 51 for engaging a complementary shoulder on a collar 52 secured to the shaft 48. It will be understood that a separate lever 46 may be provided for each of the two releasable tanks 12 shown in Figure 1, or, if desired, that cables 47 extending to the release mechanism of both tanks may be connected to a single lever 46.

With the parts in the relationship shown in full lines in Figures 3 and 4, it will be seen that any tendency of the tank 12 to become displaced, as by attempted outward movement of the rollers 22 and 23 in recesses 21, or attempted counter clockwise movement of the tank about the axes of rollers 22 and 23, will apply a counter-clockwise movement to latches 25 and 26. Such a movement, tending to collapse the toggles upwardly, is positively resisted by the fixed stops 45.

However when it is desired to release the tank the lever 46 is moved to exert a pull on cable 47 which will result in clockwise movement (as the parts appear in Figures 3 and 4) of the sector 49, shaft 38 and arms 39 to move the toggles downwardly past their dead center or fully extended positions. Thereupon forces on tank, either upward or downward aerodynamic forces or gravitational forces, will, because of engagement of rollers 22, 23 with inclined edges of recesses 21, urge the tank outwardly of the wing in a spanwise direction, which will swing the latches counter-clockwise about pivot pins 27 until the detents 28, 29 are released to allow the tank to drop (or possibly rise, under certain conditions) free of the airplane.

During the releasing action just described the toggles will be collapsed downwardly so that the line between the points of connection of the spring to bracket 44 and to the toggle is below the axis of shaft 38. Thereupon the spring will complete the downward collapse of the toggle to the position shown in Figure 4 in which the hooked end of the latch is retracted into the wing. During at least the terminal phase of this action the collar 52 moves free of the shoulder 51 of sector 49.

In the modified form of the invention shown in Figure 6, the wing structure and the part of the release mechanism installed therein may be substantially the same as that described in connection with Figures 1 to 5. In this modification, however, a bomb 53 is supported from a platform 54 by a usual electrically operated type of bomb release mechanism indicated by numeral 55. The platform is merged with the wing 11 by a fairing structure 56 which may, if desired, be so contoured as to constitute an auxiliary airfoil section or continuation of the wing which may contribute materially to the total lift of the wing. Extended from the platform are brackets 57 provided with rollers 58 corresponding to brackets 24 provided with rollers 22 and 23 in Figures 1 to 5; and brackets 59 supporting detent pins 61 which correspond to pins 28 and 29 in Figures 1 to 5.

In operation it will be understood that the bomb 53 may be dropped in the usual manner by operation of the roller mechanism 55. The releasable unit, including platform 54 and fairing 56, may remain on the airplane wing, or if desired, as in case additional speed is required for attacking or evasive action by the airplane, may be released, either before or after release of the bomb, in the manner heretofore describd in connection with the structure shown in Figures 1 to 5.

While the invention has been shown as applied to the main wing of an aircraft it will be understood that it may be applied to various other aircraft structures, such as horizontal stabilizers, struts, booms and the like, which, in the appended claims we refer to generically as an aircraft "wing."

It will also be understood that the structures herein illustrated and described are merely illustrative of preferred embodiments of the inventive principles involved, and that these principles may be employed in other physical forms, which will be readily apparent to those skilled in the art, without departing from the spirit of this invention or from the scope of the appended claims.

We claim as our invention:

1. In combination with an aircraft wing, a releasable component carried thereby, said wing at the tip thereof and said component having cooperating formations for supporting said component against movement away from the wing in all directions except outwardly in a spanwise direction, a latch pivoted to the wing along a substantially chordwise axis, the latch having a formation arranged for engagement with a latch detent on the component, said formation engaging said latch detent to restrain the component against outward spanwise movement, a latch operating toggle pivotally connecting an extension of the latch to the wing, said toggle being movable from a limit position to a latch releasing position through a fully extended position, stop means for limiting movement of the toggle in one direction to slightly beyond its fully extended position, the toggle in said limit position holding the latch operative, and means for operating said toggle from said limit position through its fully extended position to effect release of said latch.

2. In combination with an aircraft wing, a releasable component carried thereby, said wing at the tip thereof and said component having cooperating formations for supporting said component against movement away from the wing in all directions except outwardly in a spanwise direction, a latch pivoted to the wing along a substantially chordwise axis, the latch having formation arranged to depend from the confines of wing for engagement with a latch detent on the component and to lie within the confines of the wing in the disengaged position of the latch, said formation engaging said latch detent to restrain the component against outward spanwise movement, a latch operating toggle pivotally connecting the latch to the wing, said toggle being movable from a limit position to a latch releasing position through a fully extended position, stop means for limiting movement of the toggle in one direction to slightly beyond its fully extended position, the toggle in said limit position holding the latch operative, means for operating said toggle from said limit position through said fully extended position to effect release of said latch, and spring means extended between the wing and said toggle for resiliently holding it in said limit position and also for holding said latch in the disengaged position thereof.

3. In combination with an aircraft wing, a releasable component carried thereby, said wing at the tip thereof having a recess opening outwardly in a spanwise direction, the component having a roller engaged in said recess, a latch pivoted to the wing, said latch having a formation arranged to depend from the confines of wing for engagement with a latch detent on the component and to lie within the confines of the wing in the disengaged position of the latch, said latch formations engaging said latch detent to restrain the component against outward spanwise movement, a toggle pivotally connecting the latch to the wing, said toggle being movable from a limit position to a latch releasing position through a fully extended position, stop means for limiting movement of the toggle in one direction to slightly beyond its fully extended position, the toggle in said limit position holding the latch operative, means for operating said toggle from said limit position through said fully extended position to effect release of said latch, and spring means extended between the wing and said toggle for resiliently holding it in said limit position and also for holding said latch in the disengaged position thereof.

4. In combination with an aircraft wing, a releasable component carried thereby, said wing at the tip thereof having a pair of members spaced from each other chordwise of the wing, each of said members having a recess opening outwardly in a spanwise direction, the component having a pair of rollers respectively engaged in said recesses, a latch pivoted to the wing along a substantially chordwise axis, said latch having a latch formation arranged to depend from the confines of wing for engagement with a latch detent on the component and to lie within the confines of the wing in the disengaged position of the latch, said latch formation engaging said latch detent to restrain the component against outward spanwise movement, a latch operating arm pivoted to the wing on an axis substantially parallel to the latch pivot axis, a link pivotally connecting the arm with the latch, said arm and link being movable from a limit position to a latch releasing position through a fully extended position, stop means for limiting travel of the link and arm in one direction to slightly beyond fully extended position, the arm and link in said limit position holding the latch operative, means for operating said arm from said limit position through fully extended position to effect release of said latch, and spring means extended between the wing and said arm for resiliently holding it in said limit position and also for holding said latch in said disengaged position thereof.

5. In combination with an aircraft wing, a releasable component carried thereby, said wing at the tip thereof having a pair of members spaced from each other chordwise of the wing, each of said members having a recess opening outwardly in a spanwise direction, the component having a pair of rollers respectively engaged in said recesses, a pair of latches pivoted to the wing in spaced relation substantially along a chordwise axis, each latch having a hooked latch formation arranged to depend from the confines of the wing for engagement with a latch detent on the component and to lie within the confines of the wing in the disengaged position of the latches, said hooked latch formations engaging said latch detents to restrain the component against outward spanwise movement, a latch operating shaft journalled in the wing and having an operating arm for each latch, a link pivotally connecting each arm with the related latch, each said link and arm being movable from a limit position to a latch releasing position through a fully extended position, each link and arm having stop means for limiting their travel in one direction to slightly beyond fully extended position, the arms and links in said limit position holding the latches operative, means for operating said shaft to move said links and arms from said limit position through fully extended position to effect release of said latches, and spring means extended between the wing and said arms for resiliently holding them in said limit position and also for holding said latches in said disengaged position thereof.

FRANK BOWERS.
PAUL F. JOSEPH.
KENNETH C. HOLMES.

REFERENCES CITED

The following references are of record in the file of this patent:

UNITED STATES PATENTS

| Number | Name | Date |
|---|---|---|
| 1,322,160 | Breguet | Nov. 18, 1919 |
| 2,010,817 | Henry | Aug. 13, 1935 |
| 2,124,867 | Akerman | July 26, 1938 |
| 2,400,248 | Morgan | May 14, 1946 |
| 2,416,104 | Lerche | Feb. 18, 1947 |
| 2,421,699 | Johnson | June 3, 1947 |
| 2,505,604 | Clark et al. | Apr. 25, 1950 |